United States Patent [19]

Komatsu et al.

[11] Patent Number: 4,911,870

[45] Date of Patent: Mar. 27, 1990

[54] METHOD FOR PRODUCTION OF SINTERED SILICON NITRIDE ARTICLE

[75] Inventors: Michiyasu Komatsu, Yokohama; Tadashi Miyano, Sagamihara, both of Japan

[73] Assignee: Kabushiki Kaisha Toshiba, Kawasaki, Japan

[21] Appl. No.: 916,935

[22] Filed: Oct. 7, 1986

Related U.S. Application Data

[63] Continuation-in-part of Ser. No. 716,211, Mar. 26, 1985, abandoned.

[30] Foreign Application Priority Data

Mar. 29, 1984 [JP] Japan .................................. 59-61820

[51] Int. Cl.$^4$ ............................................. C04B 35/58
[52] U.S. Cl. ........................................ 264/65; 264/66; 423/344; 501/97
[58] Field of Search .................... 501/97; 423/344; 264/65, 66

[56] References Cited

U.S. PATENT DOCUMENTS

| | | | |
|---|---|---|---|
| 4,280,989 | 7/1981 | Seimiya et al. | 423/344 |
| 4,414,190 | 11/1983 | Seimiya et al. | 423/344 |
| 4,514,370 | 4/1985 | Inoue et al. | 501/97 |

FOREIGN PATENT DOCUMENTS

| | | |
|---|---|---|
| 0015422 | 9/1980 | European Pat. Off. . |
| 0082343 | 6/1983 | European Pat. Off. . |
| 54-52110 | 4/1979 | Japan .................................. 501/97 |
| 1579417 | 11/1980 | United Kingdom . |

*Primary Examiner*—Mark L. Bell
*Attorney, Agent, or Firm*—Finnegan, Henderson, Farabow, Garrett and Dunner

[57] ABSTRACT

A method for the production of a silicon nitride ceramics exhibiting high mechanical strength at elevated temperature is disclosed. This production is effected by a method which comprises preparing a mixture of silicon dioxide with excess carbon as a silicon nitride material for the silicon nitride ceramic, reducing this mixture in an atmosphere of nitrogen, roasting the resulting mixture of silicon nitride with carbon thereby giving rise to a silicon nitride-carbon mixture with the free carbon content thereof adjusted in the range of 0.1 to 3% by weight, molding the produced mixture in combination with a sintering aid in a prescribed shape, calcining the molded mixture, and thereafter sintering the calcined mass.

4 Claims, No Drawings

METHOD FOR PRODUCTION OF SINTERED SILICON NITRIDE ARTICLE

The present application is continuation-in-part of U.S. patent application No. 716,211 filed on Mar. 26, 1985, now abandoned.

FIELD OF THE INVENTION

This invention relates to a method for the production of a sintered silicon nitride article excelling in strength at elevated temperatures.

The sintered ceramic article formed preponderantly of silicon nitride possesses stability to withstand heat up to about 1900° C., exhibits a low thermal expansion coefficient, and excels in resistance to thermal shock. These characteristic features have urged a study on the feasibility of the sintered ceramic article as material for structural parts such as gas turbine blades and nozzles which are required to possess strength at elevated temperatures.

The silicon nitride powder, left alone, exhibits a poor sintering property. Thus, the practice of enhancing the powder's sintering property by the incorporation therein of a small amount of a sintering aid such as yttrium oxide, aluminum oxide, aluminum nitride, titanium oxide, or zirconium oxide has been in vogue.

Nevertheless, silicon nitride has a high sintering temperature and has room for further improvement in the control of grain growth.

CROSS REFERENCE TO RELATED APPLICATION

Formerly, the inventors, for the purpose of improving silicon nitride in this respect, devised a method of obtaining a sintered article of silicon nitride excelling in strength at elevated temperatures by mixing the powdered raw material with a small amount of carbon powder and deoxidizing the impurities entrained by the silicon nitride powder. This invention was filed for patent (Japanese Patent Application SHO 52(1977)-156389).

According to this method, by subjecting the silicon nitride powder in conjunction with a small amount of carbon powder to a heat treatment in an nonoxidative atmosphere, the impurities contained in the silicon nitride powder used as the raw material are removed and, consequently, a sintered silicon nitride article excelling in mechanical strength at elevated temperatures is obtained.

This method, however, necessitates a step for incorporating the small amount of carbon powder into the powdered raw material for sintering. Thus, the method has room for further improvement in this particular respect.

Japanese Patent Application Disclosure Sho 54(1979)-52,110 discloses a method for the production of a sintered ceramic article by the steps of admixing 100 parts by weight of a mixture consisting of silicon nitride, at least one of the oxides of aluminum and titanium, and at least one of the oxides of Y, Li, Mn, Ca, Nd, Ba, Sr and Ce with 0.2 to 10 parts by weight of carbon thereby obtaining material suitable for sintering by the atmospheric pressure method and sintering the material.

The total amount of the oxides to be used for this method is defined to be in the range of 5 to 60 parts by weight. In the specification, there is a statement which purpose that the total amount is desired to be in the range of 10 to 50 parts by weight, preferably 25 to 50 parts by weight. In the working examples, addition of these oxides in various total amounts ranging from 27 to 55 parts by weight is mentioned. This method is aimed at producing ceramics having a Si-Me-O-N system, i.e. a $\beta'$-phase silicon nitride compound, as a component phase by sintering of the atmospheric pressure method.

This method, therefore, differs from that for the production of a sintered $\alpha$-phase $Si_3N_4$ article. Further, in this case, carbon is utilized for preventing or decreasing the occurence of an excess glass phase due to addition of a large amount of oxides.

Besides, this method requires a step of admixing carbon powder with the powdered material for the sintering.

The method available for the production of the silicon nitride material to be used for the sintered silicon nitride article fall under three main types. In these methods, the method which resorts to reduction of silicon dioxide with carbon proves to be most economical. Typical analyses of the commercially available $Si_3N_4$ material obtained by the method relying on the reduction with carbon are shown in Table 1.

TABLE 1

Analyses of commercially available $\alpha$-silicon nitride powder

| $\alpha$-phase content (%) | | 99 |
| --- | --- | --- |
| Chemical component | Si | 58.99 |
| (WT %) | N | 37.63 |
| | A | 0.123 |
| | Fe | 0.010 |
| | Ca | 0.009 |
| | Mg | 0.003 |
| | O | 2.07 |
| | C | 0.93 |
| | Free $SiO_2$ | 1.01 |

The powder contains a little less than 1.0% of carbon as shonw in Table 1. This carbon, however, is contained substantially wholly in the form of SiC in the powder. Thus, substantially no free carbon is present in the powder.

SUMMARY AND OBJECT OF THE INVENTION

This invention has originated in the efforts devoted to overcoming the disadvantage of the prior art. It aims to provide a method for the production of a ceramic powder material having a prescribed amount of carbon powder necessary for deoxidation contained in advance in the silicon nitride powder as the raw material. Thus, this method excludes the special step for incorporating the carbon powder into the powdered raw material for sintering.

That is, the method of this invention for the production of a ceramic powder material is characterized by adjusting the carbon powder content of the carbon powder-containing silicon nitride powder obtained by the silica reduction process in the range of 0.1 to 3% by weight by roasting the carbon powder-containing silicon nitride powder in an oxygen-containing atmosphere, which silica reduction process comprises heating a mixture of silicon dioxide powder and an excess amount of carbon powder in a nitrogen-containing atmosphere thereby allowing the components of said mixture to react with each other.

Further, it is characterized by using the silicon nitride powder containing the carbon powder in the range of 0.1 to 3% by weight for molding a molded powder, then, calcining the obtained molded powder at a temperature in the range of 1,400° to 1,600° C. in a nitrogen-containing atmosphere, and sintering the calcined mass at a temperature in the range of 1,600° to 1,800° C. in a nitrogen-containing atmosphere.

DETAILED DESCRIPTION OF THE INVENTION

The silica reduction process comprises mixing silicon dioxide powder with carbon powder of an amount in excess of the stoichiometric equivalent weight thereof in conjunction with a small amount of silicon nitride powder as a reaction catalyst and roasting the resultant mixture, for example, in a nitrogen atmosphere at a temperature of about 1500° C. By this process, the carbon powder-containing silicon nitride powder is obtained through the following reaction.

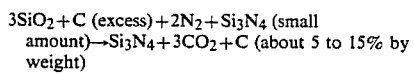

3SiO$_2$+C (excess)+2N$_2$+Si$_3$N$_4$ (small amount)→Si$_3$N$_4$+3CO$_2$+C (about 5 to 15% by weight)

In this reaction, the carbon powder is used in an excess amount for the following reason.

When the amount of the carbon powder is small, the reaction does not proceed to completion and part of silicon dioxide remains unreacted. The unreacted silicon dioxide is difficult to separate and the refined reaction product is formed a hard mass to make its pulverization difficult.

Generally in the reaction described above, SiO$_2$ is used in a proportion of 60 to 70% by weight and carbon powder in a proportion of 25 to 35% by weight and Si$_3$N$_4$ powder is additionally incorporated in a proportion of 2 to 10% by weight.

The reaction temperature is desired not to exceed 1600° C. Any rise of the reaction temperature above this level is undesirable because the excess heat tends to induce formation of SiC.

Heretofore, the carbon powder-containing silicon nitride powder so produced has been decarbonized to be used as a silicon nitride powder material containing absolutely no carbon powder.

The present invention aims to obtain a silicon nitride powder material containing residual carbon powder in an adjusted amount falling in the range of 0.1 to 3% by weight by controlling the roasting time and heating temperature during the course of the roasting operation.

In this invention, the carbon powder content after the reaction is defined as described above for the following reason. If this content is less than 0.1% by weight, the deoxidation effect is not obtained. If it exceeds 3% by weight, the sintering aid such as silicon dioxide is reduced while silicon nitride is being sintered and, consequently, the sintering property is lowered to some extent. The product of this invention is more effective when the carbon powder content is in the range of 0.5 to 2% by weight.

For the carbon powder-containing silicon nitride powder material to acquire its carbon powder content in the aforementioned range, it is advantageous to carry out the roasting in an oxygen-containing atmosphere, such as in air, at a temperature in the range of 600° to 800° C. for a period of about 0.5 to 10 hours. If the temperature is not more than 600° C., the roasting does not proceed so smoothly as required. If it exceeds 800° C., there ensues the possibility that silicon nitride will be oxidized.

The silicon nitride powder obtained as described above is optionally cracked to a proper grain size, then molded with sintering aid in a prescribed shape by the conventional method, and calcined at a temperature in the range of 1400° to 1600° C. During this calcination, the powder is deoxidized to effecte removal of impurities. By subjecting the product of this clacination to hot press sintering or normal-pressure sintering in a non-oxidative atmosphere at a temperature in the range of 1600° to 1800° C., there is obtained a sintered silicon nitride article excelling in strength at elevated temperatures.

Now, the present invention will be described more specifically below with reference to working examples. It should be noted, however, that this invention is not limited in any sense by these examples.

EXAMPLE 1

By the use of a plastic pot and plastic balls, 63% by weight of silicon dioxide powder having an average grain size of about 0.05 μm, 31% by weight of carbon powder having an average grain size of about 0.03 μm, and 6% by weight of silicon nitride (α-Si$_3$N$_4$) powder having an average grain size of about 0.6 μm were mixed. The resultant mixture was subjected to reduction in a current of nitrogen at a temperature of about 1500° C. for about three hours.

The reaction product was silicon nitride powder containing carbon powder and having an average grain size of about 0.8 μm. The carbon powder content of the mixture was 10% by weight. This mixture was heated in an oxygen-containing atmosphere at 700° C. for one hour to adjust the carbon content to 1.75% by weight.

Then, the mixed powder was further mixed with yttrium oxide, aluminum oxide, and aluminum nitride in amounts to produce a mixture consisting of 91% by weight of silicon nitride, 5% by weight of yttrium oxide, 2% by weight of aluminum oxide, and 2% by weight of aluminum nitride. This mixture was thoroughly blended and, with about 10% of paraffin added thereto as a binder, molded in a die under pressure of 400 kg/cm to produce a square block measuring 40×40×8 mm. This block was calcined in nitrogen gas at 1550° C. for about one hour and then sintered in a furnace filled with nitrogen gas at 1750° C. for about two hours.

From the sintered silicon nitride block so obtained, a square bar measuring 3×3×35 mm was cut and tested for flexural strength. This test was carried out under the conditions of 0.5 mm/min. of cross head speed, 20 mm of span and a varying temperature of room temperature, 1000° C., and 1200° C. The results (flexural strength, kg/mm) were as shown in Table 2.

TABLE 2

|  | room temperature | 1000° C. | 1200° C. |
|---|---|---|---|
| Example | 100 | 95 | 80 |
| Comparative Experiment | 95 | 80 | 50 |

In a comparative experiment, a sintered silicon nitride article was obtained from a commercially available silicon nitride powder produced by the reduction method (the analyses of which are shown in Table 1 above) by following the procedure of Example 1, excepting the step of calcination was omitted. This sintered silicon nitride article was tested for flexural strength (Table 2).

Then, the sintered ceramic article consequently obtained was assayed for carbon content. The results are shown in Table 3.

TABLE 3

| Sample No. | Product of working example | | Product of Comparative Experiment | |
|---|---|---|---|---|
| No. 1 | 0.50 | 0.57 | 0.88 | 0.79 |
| No. 2 | 0.65 | 0.52 | 0.86 | 0.83 |
| No. 3 | 0.66 | 0.66 | 0.94 | 0.86 |
| Average | 0.58 | | 0.86 | |

It is noted from Table 2 that the sintered silicon nitride article in the working example of this invention retained strength of 80 kg/mm$^2$ at 1,200° C., whereas the sintered article produced in the comparative experiment showed a notably low flexural strength of 50 kg/mm$^2$.

As concerns the residual carbon content which was determined at the same time, since the sample of the working example were invariably sintered in nitrogen gas at a temperature of 1,750° C. for 2 hours, no free carbon was present and all the carbon was present in the form of SiC in the sintered samples. As shown in Table 3, in the samples of the comparative experiment, the residual carbon contents were such as to give an average of 0.86%, a value substantially equal to the carbon content in the commercially available silicon nitride material shown in Table 1, suggesting that the SiC present in the raw material remained intact in the sintered product.

In contrast, in the sample of the working example of this invention, the residual carbon contents were such as to give a small average iof 0.58% because the calcination performed in an nitrogen-containing atmosphere at 1,550° C. for 1 hour prior to the step of sintering in accordance with this invention served to keep down the amount of SiC to be formed.

As described above, this invention enables a sintered article excelling in mechanical strength at elevated temperatures to be produced by adding excess carbon to silicon dioxide in the silica reduction method thereby obtaining a mixture of silicon nitride with carbon, roasting this mixture at a temperature of about 700° C. thereby preparing a silicon nitride powder material having a carbon content of 0.1 to 3% by weight, combining this material with not more than 5% of sintering aid thereby giving rise to a mixed powder for ceramic sintering, molding the mixed powder in a prescribed shape, further calcining the molded mass at a temperature in the range of 1,400° to 1,600° C., and thereafter sintering the calcined mass.

From the table, it is noted that the sintered silicon nitride article obtained by molding the silicon nitride powder in accordance with the present invention excels in flexural strength at elevated temperatures.

What is claimed is:

1. A method for the production of a sintered silicon nitride article comprising the steps of:
   (a) heating a mixture of 60 to 70% by weight of silicon dioxide powder and 25 to 35% by weight of carbon powder in a nitrogen-containing atmosphere to form a silicon nitride carbon powder, the carbon powder being present in an amount in excess of the stoichiometric equivalent weight;
   (b) roasting the silicon nitride carbon powder to adjust the carbon powder content of the silicon-nitride carbon powder to 0.1 to 3% by weight;
   (c) molding the resulting silicon nitride carbon powder into a shape;
   (d) calcining the molded powder in a nitrogen-containing atmosphere in the range of 1,400° to 1,600° C.; and
   (e) sintering the calcined powder in a nitrogen-containing atmosphere at a temperature in the range of 1,600° to 1,800° C.

2. The method of claim 1, wherein the mixture in step (a) includes 2 to 10% by weight of silicon nitride powder.

3. The method of claim 1, wherein the silicon nitride carbon powder is roasted at a temperature in the range of 600° to 800° C.

4. The method of claim 1, wherein the silicon nitride carbon powder is roasted for a time in the range of 0.5 to 10 hours.

* * * * *